United States Patent [19]

Dreibelbis

[11] Patent Number: 4,576,195

[45] Date of Patent: Mar. 18, 1986

[54] CARTRIDGE TYPE CONTROL VALVE WITH INVERTED J-SHAPED INLET DUCT

[75] Inventor: Richard C. Dreibelbis, Fair Lawn, N.J.

[73] Assignee: Emerson Electric Co. (H&H Precision Prod. Div.), Cedar Grove, N.J.

[21] Appl. No.: 711,295

[22] Filed: Mar. 13, 1985

[51] Int. Cl.[4] .......................................... F16K 43/00
[52] U.S. Cl. ................................. 137/315; 137/454.6; 137/505.44; 251/366
[58] Field of Search ............... 137/454.2, 454.5, 454.6, 137/315, 505.44; 251/366; 220/72; 285/222, DIG. 16

[56] References Cited

U.S. PATENT DOCUMENTS

| 632,808 | 9/1899 | Dunlap | 137/505.44 |
|---|---|---|---|
| 2,868,223 | 1/1959 | Lum | 137/505.44 X |
| 3,854,495 | 12/1974 | Cowley | 137/505.44 |
| 4,371,199 | 2/1983 | Kushner | 285/DIG. 16 X |
| 4,456,059 | 6/1984 | Cadars | 285/222 X |

*Primary Examiner*—Harold W. Weakley
*Attorney, Agent, or Firm*—Daniel H. Bobis

[57] ABSTRACT

An improved inlet duct for a cartridge type control valve which includes, a cup-like member having a bottom wall and a side wall defining the fluid transfer chamber in said control valve, is formed from a tubular member having a J-shaped configuration inverted in assembled position in the control valve, the tubular member has an inlet leg and an outlet leg continuous with the inlet leg, the inlet leg is staked in fluid tight engagement in the bottom wall of the cup-like member a predetermined distance from the side wall and defines an inlet port in the staked position extending to the exterior of the cup-like member, and an adhesive is applied between the bottom wall of the cup-like member and the exterior of the inlet leg to insure maintaining the said fluid tight seal, the outlet leg has an outlet port and in assembled position is so cantilevered into the fluid transfer chamber that the outlet port faces the bottom wall in the center line of the control valve, and an inwardly directed indentation in the side wall engages the inlet leg of the tubular member to reenforce the inlet duct in assembled position, and to thereby prevent misalignment of the outlet port during operation and installation of the control valve.

5 Claims, 9 Drawing Figures

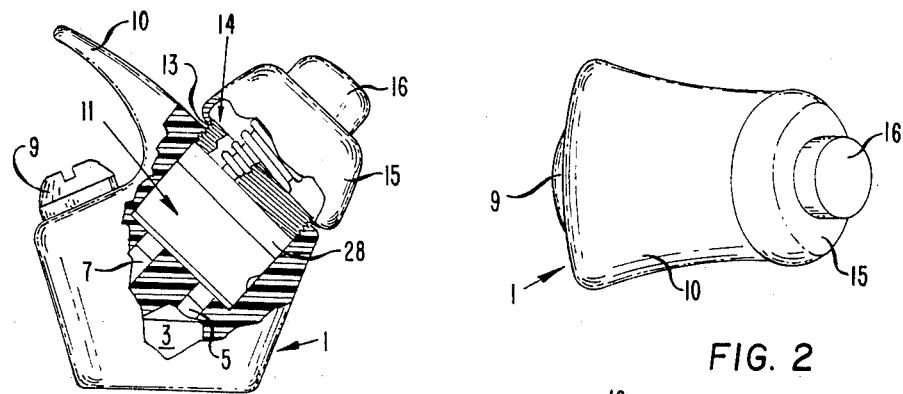
FIG. 1
FIG. 2
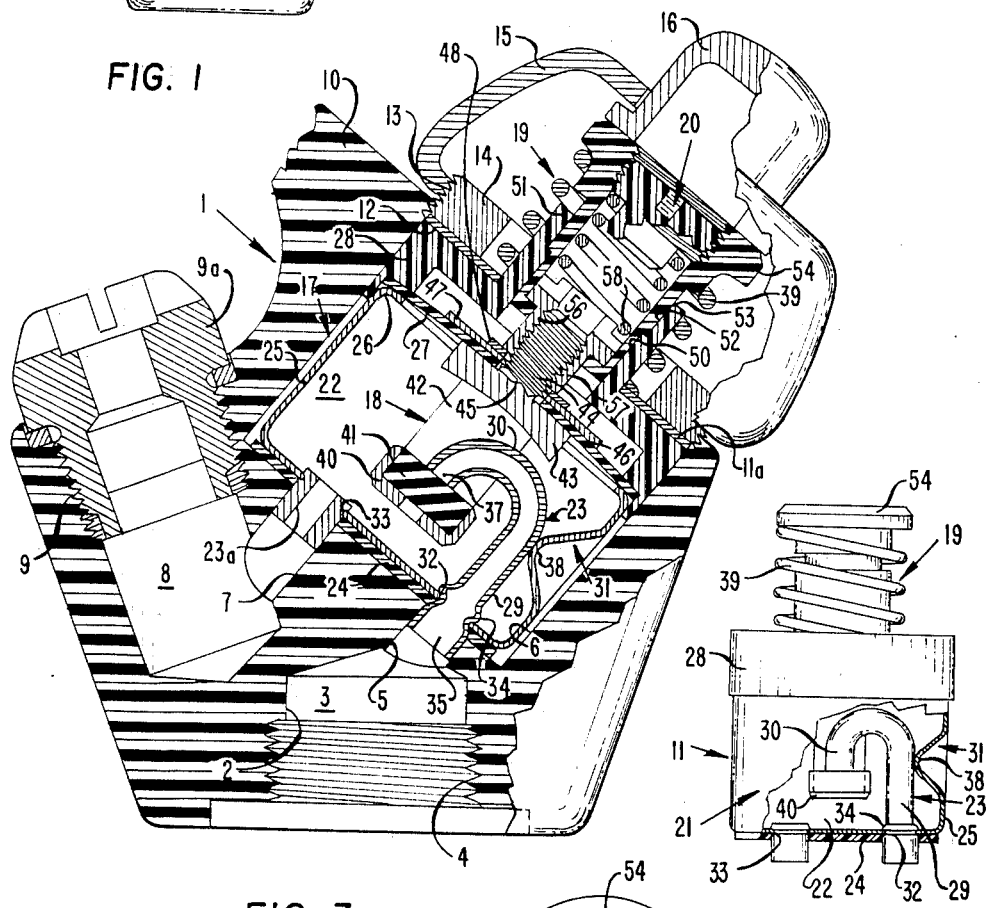
FIG. 3
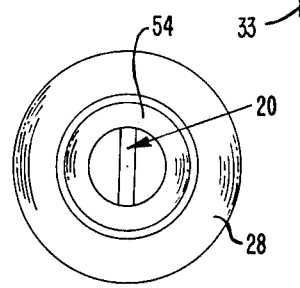
FIG. 4
FIG. 5

CARTRIDGE TYPE CONTROL VALVE WITH INVERTED J-SHAPED INLET DUCT

BACKGROUND OF THE INVENTION

This invention relates generally to fluid dispensing systems and, more particularly, to an improved cartridge type control valve for use in the dispensing head for such systems.

In U.S. Pat. No. 3,980,273 a cartridge type control valve includes inlet duct means formed in an inverted J-shaped configuration. The inlet duct means is formed by a longitudinal leg portion fabricated integrally with the cup-like means which defines the fluid transfer chamber in the control valve and an independent transverse leg ultrasonically welded at one end to the longitudinal leg and to the side wall of the cup-like member so that it is cantilevered into the center section of the fluid transfer chamber. The transverse leg at its free end has a downwardly disposed outlet port about which is formed a valve seat. Disposed in operative association with the outlet port and disposed for reciprocal movement towards and away from the valve seat is a valve head movable from a normally closed position of the control valve to an open position and vice versa by a manually operated actuating means.

In the above mentioned construction the valve head is spring biased against the valve seat on the free end of the transverse leg to normally maintain the control valve closed such that a moment of force is continuously exerted about the point where the transverse leg and longitudinal leg of the inlet duct are ultrasonically welded. As a result there is a tendancy to produce cracks or breakage in this construction at this point which causes leakage and/or failure of the control valve.

Other patents such as U.S. Pat. Nos. 3,033,466, 1,926,069; 868,599, and 632,808 disclose control valves having inverted J-shaped or L-shaped inlet duct members for use in such systems, in which the inlet duct members are formed from integral tubular elements.

With many of these valves, the J-shaped or L-shaped tubular inlet duct member is connected with insufficient reenforcing means for the portion extending into the fluid transfer chamber formed in the control valve. Such placement may result in leakage of fluid from the outlet port of the tubular inlet duct members. This is particularly true in view of the moment of force transmitted to the free end of the tubular inlet duct members due to engagement of the valve head with the valve seat about the outlet port end of such inlet duct members because of the tendancy of the free end of the tubular inlet duct members to misalign under such forces.

Deformation of the tubular inlet duct member can result, not only from the forces of the valve head against the seat, but also, initially, by those forces to which the control valve is exposed when it is installed in the dispensing head by means of the threaded retaining ring. When the cartridge type control valve is clamped against the base of the cavity in the dispensing head, the tendency is for the center of the cup-like member of the control valve to be crowned in a direction toward the operating end of the control valve. This is due to the fact that the outer walls of the cup-like member are relatively stiff, but the material toward the center of the bottom of the cup-like member is free to deflect in an upward direction due to the hydraulic forces of the gasket positioned between the bottom of the cup-like member and the cavity in the dispensing head. Since the inlet duct is secured to the bottom of the cup-like member at a position somewhat inwardly from the outer edges thereof, there is a tendency for the vertical centerline of the tubular inlet duct member to be displaced out of parallel from the centerline of the cup-like member and the cavity in the dispensing head.

This is illustrated in U.S. Pat. No. 632,808 where an inverted generally J-shaped tubular member is connected in the housing with one end in communication with the source of fluid to be controlled. The inlet duct member is bent or shaped for engagement or contact with the side wall of the housing. However, because the inverted J-shaped tubular member is at best connected in assembled position in the housing, merely for continuous communication with the source of fluid to be controlled, it suffers from the same problems of misalignment and/or deformation particularly because of its bent configuration to bring it into abutment with the side wall. Such distortion or bending of the inverted J-shaped inlet duct member makes it, difficult to position in the housing for communicating with the source of fluid to be controlled, and there is no means to avoid leakage and/or failure problems caused by the action between the valve head and the free end of the transverse portion of the inverted J-shaped inlet duct which contains the outlet port for the fluid to be controlled.

The present invention seeks to overcome these problems of the prior art and to provide an improved cartridge type control valve having an integral tubular J-shaped inlet duct member which is staked in the cup-like member of the control valve defining the fluid transfer chamber in inverted position therein. In assembled position the outlet port end of the inverted J-shaped inlet duct member is disposed in the fluid transfer chamber in the longitudinal line of the control valve for operative alignment and coaction with the valve means for opening and closing the outlet port and further means is provided to reenforce the inverted J-shaped inlet duct member in this assembled position so as to prevent misalignment thereof under the static and dynamic operating and installation conditions of the control valve.

SUMMARY AND OBJECTS OF THE INVENTION

Thus, the present invention covers an improved inlet duct for a cartridge type control valve having, a cup-like member defining a fluid transfer chamber therein comprising a generally inverted J-shaped tubular member having, an elongated inlet leg, and an outlet leg continuous with the inlet leg, said inlet leg at the end remote from the outlet leg staked into the bottom of the cup-like member for fluid tight engagement therewith and in assembled position forming an inlet to be connected to a source of fluid to be controlled by said control valve, said outlet leg having an outlet port at the free end thereof disposed for delivering fluid to be controlled to the fluid transfer chamber, said free end of the outlet leg having an outlet port disposed in the longitudinal line of the control valve, and an inwardly disposed indentation in the cup-like member in operative contact with the inlet leg to reinforce the inverted J-shaped tubular member in assembled position whereby misalignment thereof during operation and/or installation of the control valve is prevented.

Additionally, the present invention covers the combination in an improved cartridge type control valve of, a cup-like member having a bottom wall and an annular side wall defining a fluid transfer chamber, an inverted J-shaped tubular inlet duct having an inlet port disposed for communication with a source of fluid to be controlled by said control valve, and an outlet port in communication with said fluid transfer chamber and in the longitudinal line of said control valve, valve means disposed in said fluid transfer chamber and operative to normally maintain said outlet port closed, and an actuating means to actuate said valve head to open position, said inlet duct formed from a continuous length of tubing into an inverted J-shaped configuration having, an elongated inlet leg, and an outlet leg continuous with said inlet leg, said inlet leg staked in fluid tight engagement with the bottom of the cup-like member and extending into the fluid transfer chamber generally parallel to and spaced from the annular side wall of the cup-like member, and an inwardly directed indentation formed in the annular side wall of the cup-like member for contact with the inlet leg to prevent misalignment of the outlet port relative the valve means during installation, use and operation of the control valve.

Accordingly, it is an object of the present invention to provide a cartridge type control valve in which an inverted J-shaped inlet duct is staked and fixed in fluid tight engagement with the bottom wall of the cup-like member defining the fluid transfer chamber in the control valve.

It is still another object of the present invention to provide a cartridge type control valve in which the inlet duct is formed by an inverted J-shaped tubular member staked to the bottom wall of the cup-like member defining the fluid transfer chamber in the control valve and disposed in predetermined spaced relation from the annular side wall of the cup-like member.

It is yet another object of the present invention to provide a cartridge type control valve in which an indentation in the side wall of the cup-like member defining the fluid transfer chamber coacts with and reenforces the rigidity of an inverted J-shaped inlet duct staked into the bottom wall of the cup-shaped member to prevent misalignment of said inlet duct assembly during use and operation of the control valve.

It is a further object of the present invention to provide a cartridge type control valve in which support for the inlet duct is provided to permit movement thereof only in a direction parallel to the centerline of the cup-like member.

The above, and other, objects, features and advantages of the present invention will become readily apparent from the following detailed description thereof which is to be read in connection with the accompanying drawings.

BRIEF DESCRIPTION OF THE DRAWINGS

FIG. 1 is a side view of a dispensing head for a fluid dispensing system such as a water cooler partially in vertical section to show in side elevation a cartridge type control valve in accordance with the present invention in assembled position therein;

FIG. 2 is a top plan view of the dispensing head of FIG. 1;

FIG. 3 is a vertical cross-sectional view of the dispensing head and the cartridge type control valve in accordance with the present invention shown in FIG. 1;

FIG. 4 is an elevational view, partly broken away, of the cartridge type control valve shown in FIG. 3;

FIG. 5 is a top plan view of the cartridge type control valve shown in FIG. 4;

DETAILED DESCRIPTION OF A PREFERRED EMBODIMENT

Figure 6:
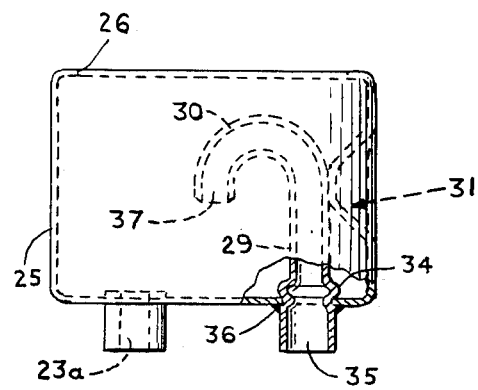
FIG. 6 is a side elevational view, partly in phantom, of the cup-like member and inlet duct of the cartridge type control valve shown in FIG. 4.

Referring to the drawings, FIGS. 1, 2, and 3 show a conventional dispensing head 1 of the push button type which is used in well-known fluid dispensing devices such as the water coolers found in offices, industrial plants, public buildings, etc.

These dispensing heads have been generally standardized to receive a cartridge type control valve of the type referred to and shown in the prior art devices above described.

Since many hundreds of thousands of these dispensing heads have been used and many thousands more will be used it is thought clear that there is not only a market for newly manufactured control valve units which fit such dispensing heads but additionally a large market for replacement units to repair defective control valves or for use in the rebuilding or retrofitting of entire dispensing heads.

Additionally, because of the cost of redesign and the retooling required, manufacturers of fluid dispensing devices and fluid dispensing systems which utilize such dispensing heads are reluctant to change existing designs without great cost reduction incentive. This means that any improved control valve must be so designed that they can be substituted for or can replace the known prior art type control valves.

The improved cartridge type control valve of the present invention hereinafter meets all of the exacting requirements for fulfilling thesed commercial requirements.

In FIGS. 1, 2, and 3 the conventional casting or forging now in use for the dispensing head 1 is shown as having a central bore 2 which defines an inlet chamber 3 for the fluid to be controlled and dispensed by the cartridge type control valve generally designated 11 and more fully described hereinafter. The dispensing head is threaded as at 4 for connection to support means, not shown, having the source of fluid to be delivered to the bore 2. An inlet passage 5 in the dispensing head communicates at one end with the inlet chamber 3 and at the other end with a central cavity 6 in which the the cartridge type control valve 11 will be mounted, as is also more fully described below. A discharge passage 7 in the dispensing head communicates at one end with the central cavity 6 and at the opposite end with discharge chamber 8 which supplies the fluid to be dispensed to dispensing nozzle 9 having the dispensing outlet 9a. The nozzle is detachably connected in the dispensing head 1 adjacent to a water deflector or shield 10.

To control the flow of water or other fluid to be dispensed by the dispensing head 1 the cartridge type control valve 11 in accordance with the present invention is shown as adapted for use in and for replaceable mounting in the central cavity 6 of the dispensing head 1.

Control valve 11 is held in cavity 6 by interengaging threaded means as at 12 in the open or mouth end of the central cavity 6 and at 13 on a locking nut 14 which in assembled position will bear against shoulder 11a formed medially along the control valve 11.

FIGS. 1, 2, and 3 show that the locking nut 14 uses only a portion of the threaded means 13 to hold the control valve in assembled position. The remaining portion of the threads receive a cover and push button retainer 15 within which is slidably disposed a push button 16 which in non-actuating position is in loose engagement with an actuating assembly generally designated 19 on the control valve 11.

CONTROL VALVE

Control valve 11 is of the cartridge type in that it is insertable and removable from the central cavity 6 in the dispensing head 1 as a single integral unit.

As shown in FIG. 3, 4, and 5, control valve 11 includes broadly a fluid transfer assembly generally designated 17, valve means 18 to control the flow of fluid through the fluid transfer assembly 17 and the actuating assembly 19 operatively disposed between the valve means and the push button 16 for operating the actuating assembly 19.

The actuating assembly 19 includes a regulator subassembly 20 generally identical with some of the cartridge type control valves shown in the above mentioned prior art patents.

The control valve 11 herein described permits a substantial number of those parts of the control valve which have heretofore required special materials and machining of the parts to close tolerances to now be formed from plastic or plastic like materials and thus to be fabricated and assembled by relatively simple techniques so that the costs of such parts and control valves made therefrom can be materially decreased, as described in U.S. Pat. No. 3,980,273, the entire disclosure of which is incorporated herein by reference.

Certain parts such as the springs, nuts, washers, etc. are at present made so cheaply that there is no need for converting these over to plastic parts and to the extent that these elements are used the control valve of the present invention is not an all plastic device. Where applicable those parts as hereinafter described that are plastic are preferably made of durable and machinable plastics or plastic like materials such as those sold under the trademark "Celcon" or "Delrin" which are polymeric acetals. Therefore, when the word plastic or plastic material is used herein it will be understood to mean materials of this type.

However, while these materials have been designated it will be understood by those skilled in this art that any type of plastic material or resinous material or the like type material may be used for these elements provided that the physical properties of such materials provide non-water absorption; adaptability to hot and cold systems; tensile strength and dimensional stability. Any thermal plastic or thermal setting material meeting these requirements which remains stable and is not adversely affected by constant exposure to air or water between the normal operating and shipping temperatures of $-10°$ F. to $+180°$ F. to which the control valves may be subjected can be utilized for the plastic parts and assemblies of the control valve described herein, and more particularly, for those assemblies designed for handling the transfer of the fluid to be dispensed by the systems in which the control valve will be used.

FLUID TRANSFER ASSEMBLY

Figure 7:
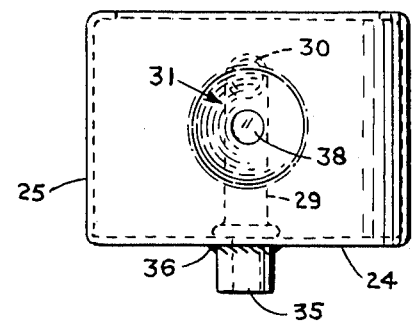
FIG. 7 is a rear elevational view, partly in phantom, of the cup-like member and inlet duct shown in FIG. 6.
Figure 8:
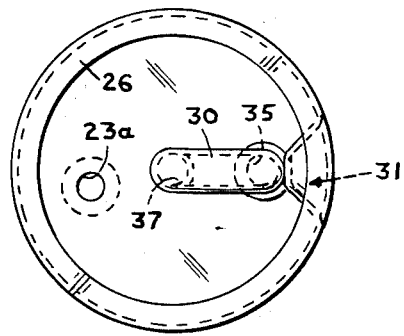
FIG. 8 is a top plan view of the cup-like member and inlet duct shown in FIG. 6.
Figure 9:
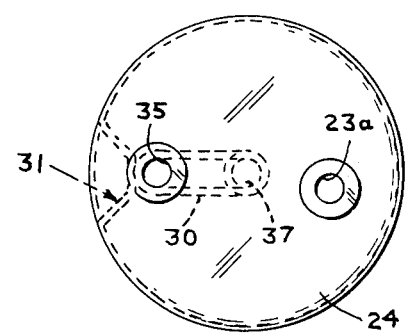
FIG. 9 is a bottom plan view, partly in phantom, of the cup-like member and inlet duct shown in FIG. 6.

Referring to FIGS. 1 and 3 to 9 of the drawings, the fluid transfer assembly 17 includes a cylindrical cup-like member 21 which defines a fluid transfer chamber 22 and an inlet duct assembly 23 disposed in the fluid transfer chamber 22 and staked in fluid tight engagement in the cup-like member 21 as will now be described.

Cup-like member 21 has a bottom 24, an annular side wall 25, and an open end, remote from the bottom, about which an inwardly turned upper flange or rim 26 provides a pressure bearing surface. An elastomeric diaphragm type seal 27 rests and is clamped in assembled position between the upper flange or rim 26 and a cover element 28 of the actuating assembly 17 as is clearly shown in FIGS. 1 and 3 and 6 to 9 of the drawings.

The cup-like member 21, the elastomeric diaphragm type seal 27 and the plastic cover member 28 in assembled position form the fully enclosed fluid transfer chamber 22 in the control valve 11.

The inlet duct 23 is made from a continuous length of standard stainless steel alloy or the like type tubing and in assembled position is disposed in the fluid transfer chamber 22. The tubing is formed into an J-shaped configuration having an elongated inlet leg 29 and an outlet leg 30 continuous therewith.

The inlet duct 23 is so staked into the bottom 24 of the cup-like member 22 that it is disposed in an inverted generally vertical position normal to the bottom 24 and parallel to the annular side wall 25. The inlet leg of the inlet duct will be disposed a predetermined spaced distance from the inner surface of the annular side wall 25 to facilitate the staking of the inlet duct into the bottom 24 of the cup-like member 21 and also to enable suitable reenforcement means generally designated 31 to be struck in the annular side wall of the cup-like member for reasons that will appear clear from the description below.

Thus, refering to FIGS. 3, 4 and 6 to 9, the cup-like member 21 is further shown as having spaced openings as at 32 and 33. The free end of the inlet leg 29 of the inlet duct 23, remote from the point of connection with the outlet leg 30, is staked in fluid tight engagement within opening 32. In particular the free end of the inlet leg 29 is preformed with an enlarged circumferential section 34, spaced from the end thereof, which abuts the inner face of the bottom 24 about the opening 32 when inserted through opening 32 during installation. The portion of the free end of inlet leg 29 extending through the opening 32 to the exterior of the cup-like member 21 is then expanded into a bell shape to form inlet port 35 and to provide a leak-tight seal at the interface between the cup-like member and the inlet duct.

The effect of the staking procedures in the fabrication of the fluid transfer assembly 17 is to form a fluid tight seal between the exterior of the inlet duct assembly 23 and the opening 32 in the bottom 24 of cup-like member 21 and to provide an inlet port 35 in assembled position which as shown in FIG. 3 will communicate with the inlet bore 5 to permit the fluid to be dispensed to flow through inlet chamber 3, inlet passage 5 to the inlet port 35 of the inlet duct assembly 23 so it can pass to the inlet duct, through the fluid transfer chamber 22 for the control valve 11.

Staking of the inlet leg 29 into opening 32 in the bottom 24 of the cup-like member 21 must be accomplished so as to establish a fluid tight seal capable of withstanding fluid pressures up to 150 PSIG and a turning torque of 2 inch-pounds. These conditions are imposed in order to meet the exigencies which may occur during the installation, use and operation of cartridge type control valves particularly those used for water dispensing systems.

To further insure that the seal between exterior of the inlet leg 29 and the opening 32 remains fluid tight an adhesive is applied as at 36 to the exterior face of the bottom 24 about the opening 32. Anaerobic adhesive/sealants such as those sold under the Trademark "Loctite" or those equivalent thereto can be used for this purpose. Such adhesives cure at room temperature in about twelve hours or they may be cured at 200° to 212° F. in about five minutes. The adhesive must first be applied and cured before fluid pressure and torque tests can be exerted on the inlet duct assembly 23.

The outlet leg 30 of the inlet duct assembly 23 due to the inverted J-shaped configuration of the inlet duct assembly 23 in assembled position will be disposed in the fluid transfer chamber 22 so that an outlet port 37 at the free end of the outlet leg 30 will lie in the longitudinal centerline of the control valve facing the inner surface of the bottom 24 of the cup-like member 21 and will be disposed a predetermined spaced distance from said bottom 24 for operative association with the valve means 18 which controls the flow of fluid from the inlet duct assembly 21 into the fluid transfer chamber 23.

This alignment of the inlet duct assembly 21 which enables the outlet port 37 to lie and be maintained in the longitudinal axis of the control valve is controlled and maintained by the reenforcing means 31. Reenforcing means 31 consists of an indentation or dimple which is struck in the annular side wall 25 to extend inwardly into the fluid transfer chamber 22 for contact with the inlet leg 29 of inlet duct assembly 23. Preferably the indentation defining the reenforcing means 31 has a frusto-conical shape with a flat land as at 38 at the portion thereof in contact with the inner leg 29.

While the reenforcement means is shown as having a flat land as at 29, those skilled in the art will readily understand that the land could be curved or formed for snug engagement with the exterior wall of the inlet leg 29 without departing from the scope of the present invention.

VALVE MEANS

To control the flow of fluid into fluid transfer chamber 22 the valve means 18 is provided.

Valve means 18 is disposed by the action of spring means 39 to normally maintain outlet port 37 closed. The actuating assembly 19, which can be manually operated, will move the valve means 18 to open position. When the actuating assembly 19 is released the valve means 18 will return to the normally closed position by the action of the spring means 39, as will be understood by those skilled in the art.

Valve means 18 includes a valve head 40 having an elastomeric pad or seal 41 installed therein to facilitate sealing the outlet port on the inlet duct assembly 23.

The valve head 40 is connected between one end of a pair of spaced legs 42 (only one of which is shown) formed on a yoke member or stirrup 43. Legs 42 are so spaced that they fit snugly about the outlet leg 30 of the inlet duct assembly 23 to permit the yoke member or stirrup 43 to move to and fro parallel to the centerline or longitudinal axis of the control valve 11. Thus the valve head 40 can be moved from the normally closed position to the open position and vice versa relative the outlet port 37.

A valve stem 44 is connected to or preferably formed integral with the yoke 43 at the end remote from the point where the valve head 40 is mounted. It extends upwardly through a medially disposed opening 45 in the diaphragm member 27 and is connected with the actuating assembly 19 for actuating the valve means 18, all of which is shown in FIG. 3 of the drawings.

By reference to FIG. 3, the opening 45 is shown as being maintained fluid tight between the flat upper shoulder 46 of the yoke or stirrup member 43 on the one side and a diaphragm disc 47 and lock washer 48 on the other side by means of a connecting member 57 threadably mounted on the valve stem 44 which connecting member 57 also provides a lost motion connection between the valve means 18 and the actuating assembly 19.

The actuating assembly 19 is slidably disposed in an elongated bore 50 formed by an elongated longitudinally extending annular member 51 on cover member 28, so disposed that when the cover member is in assembled position the elongated longitudinally extending annular member 51 will be concentric with the longitudinal centerline of the control valve 11.

The elongated bore 50 is formed by the inner wall of the annular member 51, and formed on the inner wall or bore 50 parallel to the centerline of the control valve are keys or guides 52. The purpose of the keys 52 is to prevent flange 54 of spring housing 53 from rotating about its axis relative to cover element 28 when the range screw of regulator sub-assembly 20 is turned to adjust the stream from the dispensing head.

In FIG. 3 the actuating assembly 19 is shown to include a tubular spring housing 53 which is also made of plastic material and is sized so that it can be mounted for sliding movement in the elongated bore 50. Guiding grooves (not shown, such as those shown in U.S. Pat. No. 3,980,273, are formed on the outer wall of the tubular spring housing 53 so that in assembled position, the guiding grooves will be in continuous engagement with keys 52 formed on the inner wall or elongated bore 50.

The upper end of spring housing 53, that is, the end remote from the fluid transfer assembly 17 is provided with an outwardly extending flange 54. When the spring housing 53 is assembled in its operating position, the return spring 39 will be mounted about the annular member 51 and spring housing 53 so that it is contained between the upper shoulder 11a on cover member 28 at one end and the outwardly extending flange 54 at the opposite end. When pressure is exerted on this flanged end of the spring housing 53 to move it into the elongated bore 50, the spring 39 will be compressed and valve 40 will open the outlet port 37 on the inlet duct assembly 23. When the pressure is released spring 39 will expand to return the spring housing 53 to the position shown in FIG. 3 and valve 40 will return to the normally closed position.

The end of the spring housing 53 remote from the upper flange 54 is provided with a lower inwardly extending flange or shoulder 55 which has an opening 56 therethrough for mounting the valve stem connecting member 57.

A slot 58 at the upper end of the connecting member 57 will permit this member to be threaded into full engagement with the threaded valve stem 44 so as to hold the diaphragm disc 46 and washer 47 in position and thus will provide the fluid tight seal about the medially disposed opening 45 in the diaphragm member 27, as above described.

The manner in which the connecting member 57, the spring housing and the range spring assembly 20 coact to adjust the operation of the control valve 11 are well known in the art, are described in U.S. Pat. No. 3,980,273 and are therefore not more fully described herein.

The push button 16 of course is so disposed that when manual pressure is exerted against the push button 16 it will engage the flanged end 54 of the spring housing 53, and cause the spring housing to slide in the elongated bore 50 of annular member 51 to thus move valve 40 from the normally closed to open position, all of which is clearly shown in FIG. 3 of the drawings.

OPERATION

When the control valve 11 is assembled as shown in FIGS. 3 and 4, the return spring 39 will hold the spring housing 53 of the actuating assembly 19 so that the inwardly extending flange 55 engages the connecting member 57 to force and maintain the valve head 40 connected thereto in engagement with the valve seat 37. In this position, the outlet port 37 is normally closed.

When a force is exerted at the upper end of the spring housing as by manually depressing the push button 16 which is disposed in engagement with the flanged end of the spring housing 53, it will be moved along the centerline of the control valve 11 so that the inwardly extending flange 55 will disengage from the connecting member 57.

Since the elements of the valve assembly means 18 are connected to the connecting member 51, the pressure of the fluid acting in outlet port 37 will force the valve head 40 off the valve seat 37a and fluid will flow from the source through inlet 3 through inlet passage 5 into inlet port 35 on the inlet duct 23, through the inlet duct and out of the outlet port 37 into the fluid transfer chamber 22.

Since the fluid transfer chamber 22 communicates with the discharge nozzle 9 above described, fluid will immediately flow through the discharge port 23a, outlet passage 7, discharge chamber 8 and out through the discharge nozzle 9 of the dispensing head 1.

When the force is exerted on the upper end of the spring housing 53 so as to move it axially along the centerline to open the outlet port 37, the return spring 39 will be compressed. When the force exerted against the upper end of the spring housing is released the return spring 39 will expand to force the spring housing 53 to move so that the inwardly extending flange 55 engages the connecting member 57 and thus cause the valve assembly means 18 to return valve head 40 to the normally closed position cutting off further delivery of fluid by displacement from the fluid transfer chamber 22 to the discharge nozzle 9.

The opening and closing of the outlet port 37 will be repeated in the same manner as above described to control dispensing of fluid from the inlet 3 to the discharge nozzle 9 in the dispensing head 1.

Thus an improved cartridge type control valve has been described which is also adapted for use or for replacement in the known prior art fluid dispensing heads particularly those used in water coolers and the like water dispensing appliances. This improved cartridge type control valve differs from the prior art control valves of this type in that the inlet duct is an integral inverted J-shaped tubular member made from stainless steel alloy which is so staked into the bottom of the cup-like member defining the fluid transfer chamber in the control valve and reinforced in assembled position that it forms a fluid tight connection and misalignment is prevented between the outlet port end of the inlet duct assembly and the valve head of the valve assembly means operative to open and close the outlet port of the inlet duct.

Having described a specific preferred embodiment of the present invention with reference to the accompanying drawings, it is to be understood that the present invention is not limited to that precise embodiment, and that various changes and modifications may be effected therein by one of ordinary skill in the art without departing from the scope or spirit of the present invention as defined by the appended claims.

What is claimed is:

1. A cartridge type control valve for use in a fluid dispensing system, including a cup-like member having a bottom wall and a side wall defining a fluid transfer chamber, the combination with said cup-like member of, an inlet duct comprising,
   a. a tubular member formed into a J-shaped configuration having an elongated inlet leg and an outlet leg continuous with said inlet leg,
   b. said outlet leg defining an outlet port at the end remote from the inlet leg,
   c. the inlet leg at the end remote from the outlet leg stacked into the bottom wall of the cup-like member a predetermined distance from the side wall so that a portion thereof projects to the exterior of the bottom wall to form an inlet port for the inlet duct,
   d. said inlet duct disposed in assembled position in the cup-like member in inverted position and the outlet leg cantilevered so that the outlet port lies in the longitudinal centerline of the control valve and faces the bottom wall of the cup-like member,
   e. reenforcing means in said control valve to prevent misalignment of the outlet port in assembled position,
   f. said reenforcing means comprising, an inwardly directed indentation in the side wall of the cup-like member sized for intimate contact with the inlet duct.

2. A cartridge type control valve for use in a fluid dispensing system including, a cup-like member having a bottom wall and a side wall defining a fluid transfer chamber, the combination with said cup-like member of, an inlet duct comprising,
   a. a tubular member formed into a J-shaped configuration having an elongated inlet leg and an outlet leg continuous with said inlet leg,
   b. said outlet leg defining an outlet port at the end remote from the inlet leg,
   c. the inlet leg at the end remote from the outlet leg staked into the bottom wall of the cup-like member a predetermined distance from the side wall so that a portion thereof projects to the exterior of the bottom wall to form an inlet port for the inlet duct,
   d. said inlet duct disposed in assembled position in the cup-like member in inverted position and the outlet leg cantilevered so that the outlet port lies in the longitudinal centerline of the control valve and faces the bottom wall of the cup-like member,
e. adhesive means between the bottom wall and the exterior of the inlet leg at the point where said inlet duct is staked into the bottom wall of the cup-like member,
f. reenforcing means in said control valve to prevent misalignment of the outlet port in assembled position,
g. said reenforcing means comprising, an inwardly directed indentation in the side wall of the cup-like member operative to engage the inlet leg of the inlet duct in assembled position.

3. The combination according to claim 1 wherein the said indentation has a frusto-conical shape terminating in a substantially flat land in the position thereof disposed for intimate contact with the inlet leg of the inlet duct.

4. A cartridge type control valve comprising,
a. a cup-like member having a bottom wall and a side wall defining a fluid transfer chamber,
b. valve means mounted for reciprocable movement in said control valve including, a valve head disposed in the fluid transfer chamber,
c. an inlet duct formed from a tubular member having a J-shaped configuratin and having an elongated inlet leg, and an outlet leg continuous with said inlet leg,
d. said inlet leg staked into the bottom wall of said cup-like member a predetermined spaced distance from the side wall and disposed to extend to the exterior of the bottom wall for forming an inlet port for said control valve,
e. said outlet leg having an outlet port and in assembled position cantilevered so that outlet port lies in the longitudinal centerline of said control valve for operative coaction with said valve head to maintain the control valve normally closed,
f. adhesive means between the bottom wall and the exterior of the inlet duct at the point where said inlet leg is staked into the bottom wall of the cup-like member, and
g. reenforcing means in said control valve in intimate contact with the inlet duct to prevent misalignment of the outlet port relative to the valve head, and
h. said reenforcing means comprising,
  i. an inwardly directed indentation formed in the side wall of the cup-like member, and
  ii. said indentation having a frusto-conical shape and terminating in a flat land at the point where the inwardly directed indentation is in intimate contact with the inlet leg of the inlet duct.

5. An improved fluid transfer assembly for a cartridge type control valve comprising,
a. a cup-like member having a bottom wall and a side wall defining the fluid transfer chamber in said control valve,
b. an inlet duct made from a tubular member having a J-shaped configuration, said tubular member having an elongated inlet leg, and an outlet leg continuous with said inlet leg,
c. said inlet leg staked into the bottom wall of the cup-like meber and disposed to extend to the exterior of the bottom wall to form an inlet port for the fluid transfer assembly,
d. said outlet leg cantilevered in assembled position so that the outlet port therein lies in the centerline of the fluid transfer assembly of the control valve,
e. reenforcing means in siad cup-like member to prevent the outlet port from misaligning during operation and installation of the control valve,
g. adhesive means is provided between the bottom wall and the exterior of the inlet duct at the point where said inlet leg is staked into the bottom wall of the cup-like member to insure a fluid tight connected therebetween, and
h. the reenforcing means includes:
  i. an inwardly directed indentation in the side wall of the cup-like member operative to engage the inlet leg of the inlet duct,
  ii. said indentation having a frusto-conical shape and terminating in a substantially flat land at the point of contact with the inlet leg of the inlet duct.

* * * * *